Jan. 20, 1931.  G. FEATHER  1,789,732
INDICATING DEVICE
Filed Dec. 9, 1926
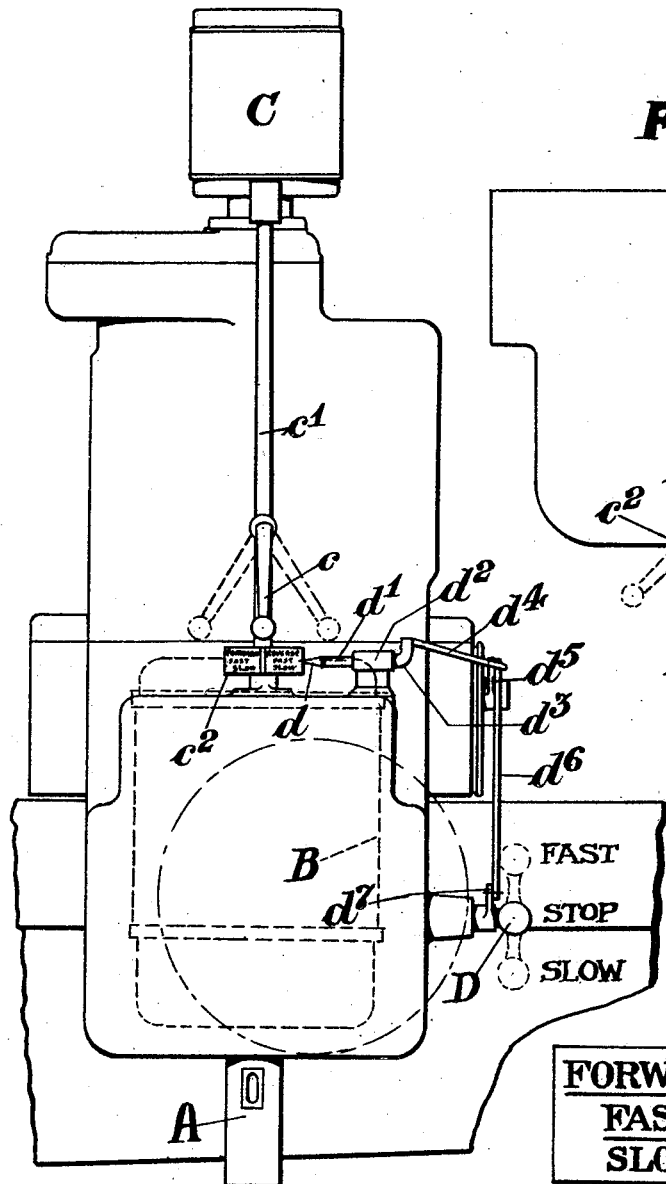
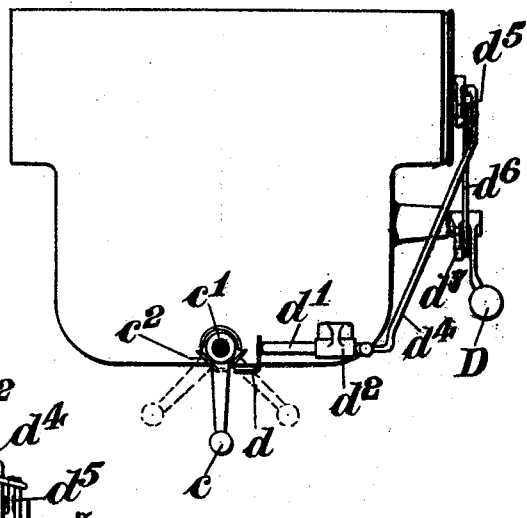
INVENTOR:
George Feather
by Morris␣␣Miller Atty.

Patented Jan. 20, 1931

1,789,732

UNITED STATES PATENT OFFICE

GEORGE FEATHER, OF HALIFAX, ENGLAND

INDICATING DEVICE

Application filed December 9, 1926, Serial No. 153,694, and in Great Britain December 30, 1925.

This invention relates to drilling machines and the like and has for its chief object to introduce an improved spindle drive which will dispense with gear wheels and friction clutches such as are ordinarily used when the spindle has to run at different speeds in either direction such for example as when tapping and backing out and also when drilling large and small holes, and in the case of a radial drill will simplify the design of the carriage.

According to this invention the spindle is driven from an electric motor that will run at two speeds in either direction or at two speeds in a forward direction and at a quick speed in the reverse direction, the direction and speed of rotation of the motor being controlled by one or more switches to cause it to run slowly in one direction for tapping and quickly in the other direction for backing out, and slowly in one direction for drilling large holes and quickly in the same direction for drilling smaller holes.

In the accompanying diagrammatic drawings:—

Fig. 1 is a front elevation of part of a radial drilling machine provided with spindle driving mechanism in accordance with this invention.

Fig. 2 is a plan of the switch mechanism shown in Fig. 1, and

Fig. 3 is an enlarged face view of an angle plate with indicia marked thereon.

A indicates the drill spindle, B the motor, C the main switch and D a reversing and speed changing switch.

In the example shown the switch C is actuated by an arm $c$ on a shaft $c^1$, and rigidly fixed on such shaft is an angle plate $c^2$. One face of this angle plate bears the words "Forward fast", "Forward slow" and the other face bears the words "Reverse fast", "Reverse slow". When the switch arm $c$ is moved to one extreme position or the other, one face, or the other is turned to face the operator. Situated by the side of the angle plate $c^2$ is an indicator $d$ which is moved from one indicating position to the other by connections from the switch D. In the example shown the indicator $d$ is fixed on a shaft $d^1$ rotatably mounted in a bearing $d^2$. Such shaft is cranked at $d^3$ and pivotally connected by a link $d^4$ with a lever $d^5$ which is connected by a link $d^6$ with an arm $d^7$ that moves with the switch arm D. With this construction if the main switch arm $c$ is moved to one extreme position it will start the motor to drive the drill spindle at a speed in a forward direction. If the switch arm is moved to the other extreme position the motor will reverse and drive the drill spindle in the opposite direction at the same speed. If it is desired to drive the drill spindle at the fast speed, the switch D is moved to the fast position whereupon the drill spindle can be driven at the fast speed in either direction by moving the position of the switch arm $c$ from one extreme position to the other. If it is desired to rotate the drill spindle at the slow speed in the forward direction and at a quick speed in the reverse direction the main switch C is moved to the forward position to give the slow forward speed, and the switch D is then moved to the fast position to reverse the direction of rotation of the spindle at the fast speed. To reverse these operations the switch arm $c$ is moved to the reverse position and the switch arm D is moved to the fast position to reverse the direction of rotation of the drill spindle and drive it in a forward direction at the fast speed. All these movements are clearly shown by the indicator and angle plate so that it is nearly impossible for the operator to get wrong.

The motor B may be mounted in the manner described in my pending United States patent applications Nos. 88,876 and 88,879.

What I claim as my invention and desire to secure by Letters Patent in the United States is:—

In a motor driven machine, having a hand lever for controlling the forward and reverse operation of said machine and another hand lever for controlling the fast and slow speed of said machine, the combination of a plate, means for reversing said plate movable by said first lever, and an indicator pointer associated with said plate, means for rendering said pointer movable by said second lever, said plate having legends so arranged that they are alternately moved to a position to cooperate with the indicator in the two positions of said other means and that only one set of said legends is cooperable with the indicator in either position of said member, said legends indicating the "forward fast", "reverse slow", "reverse fast" and "forward slow" control of the motor depending on the relative positions of the controlling means.

In testimony whereof I affix my signature.

GEORGE FEATHER.